(12) United States Patent
Xiong et al.

(10) Patent No.: US 10,778,959 B2
(45) Date of Patent: Sep. 15, 2020

(54) ROBOT-BASED 3D PICTURE SHOOTING METHOD AND SYSTEM, AND ROBOT USING THE SAME

(71) Applicant: UBTECH Robotics Corp, Shenzhen (CN)

(72) Inventors: Youjun Xiong, Shenzhen (CN); Xiangnan Gu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 174 days.

(21) Appl. No.: 16/205,282

(22) Filed: Nov. 30, 2018

(65) Prior Publication Data
US 2019/0208180 A1 Jul. 4, 2019

(30) Foreign Application Priority Data
Dec. 28, 2017 (CN) .......................... 2017 1 1465682

(51) Int. Cl.
*H04N 13/00* (2018.01)
*H04N 13/128* (2018.01)
*H04N 13/211* (2018.01)
*H04N 13/296* (2018.01)
*H04N 13/221* (2018.01)

(52) U.S. Cl.
CPC ......... *H04N 13/221* (2018.05); *H04N 13/128* (2018.05); *H04N 13/211* (2018.05); *H04N 13/296* (2018.05); *H04N 2013/0081* (2013.01)

(58) Field of Classification Search
None
See application file for complete search history.

(56) References Cited

U.S. PATENT DOCUMENTS

| | | | | | |
|---|---|---|---|---|---|
| 5,473,364 | A | * | 12/1995 | Burt | G08B 13/19602 348/47 |
| 5,937,212 | A | * | 8/1999 | Kurahashi | G03B 37/02 396/20 |
| 8,350,895 | B2 | * | 1/2013 | Allen | H04N 13/221 348/50 |

(Continued)

OTHER PUBLICATIONS

M.V. Srinivasan et al., "Robot navigation inspired by principles of insect vision," Robotics and Autonomous Systems 26 (1999) 203-216 (Year: 1999).*

*Primary Examiner* — Soo Shin

(57) ABSTRACT

The present disclosure provides a robot-based 3D picture shooting method and system, and a robot using the same. The method includes: obtaining a distance between a photographed object and the photographing device of the robot based on a received shooting instruction; calculating an inter-axis distance based on the distance; obtaining the first picture after moving the robot for half of the inter-axis distance along the movement direction; obtaining the second picture after moving the robot for entire of the inter-axis distance from a current position along an opposite direction of the movement direction; and synthesizing the first picture and the second picture to obtain a 3D picture of the photographed object. In the process, the robot moves the photographing device according to the calculated inter-axis distance, and obtains two pictures of the left and right of the photographed object, which is not necessary to use a binocular camera.

18 Claims, 5 Drawing Sheets

(56) References Cited

U.S. PATENT DOCUMENTS

2001/0045979 A1* 11/2001 Matsumoto .......... H04N 13/279
                                                    348/43
2015/0312558 A1* 10/2015 Miller ................ G02B 27/0093
                                                    348/54
2019/0327394 A1* 10/2019 Ramirez Luna ..... H04N 13/106

* cited by examiner

ROBOT-BASED 3D PICTURE SHOOTING METHOD AND SYSTEM, AND ROBOT USING THE SAME

CROSS REFERENCE TO RELATED APPLICATIONS

This application claims priority to Chinese Patent Application No. 201711465682.3, filed Dec. 28, 2017, which is hereby incorporated by reference herein as if set forth in its entirety.

BACKGROUND

1. Technical Field

The present disclosure relates to robot technology, and particularly to a robot-based 3D picture shooting method and system for a robot with a photographing device, and a robot using the same.

2. Description of Related Art

The principle of taking a 3D (three-dimensional) picture trough a 3D picture shooting device is similar to that of looking at an object through human eyes. When two eyes look at the same object, the parallax is formed due to the slightly different angles at which the two eyes located with respect to the object. The brain will automatically synthesize two pictures of the two eyes to form a deep vision, while the 3D picture shooting, device displays two shot pictures in the same way. In the conventional 3D picture shooting, the shooting device must have two sets of cameras, the focal length of the cameras is generally fixed, and the distance between the two sets of cameras is also fixed, otherwise the shot pictures will not have an ideal three-dimensional visual effect. However, the fixed-focus shooting device with two sets of cameras can't meet the requirement of some photographers with higher requirements, while the cost of the camera is greatly increased due to using two cameras.

BRIEF DESCRIPTION OF THE DRAWINGS

To describe the technical schemes in the embodiments of the present disclosure more clearly, the following briefly introduces the drawings required for describing; the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, tot purposes of explanation instead of limitation, specific details such as particular system architecture and technique are set forth in order to provide a thorough understanding of embodiments of the present disclosure. However, it be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

In the embodiments of the present disclosure, a distance between a photographed object and a photographing device disposed in the robot is obtained based on a received shooting instruction, if a movement direction of a robot is perpendicular to, a shooting direction of the photographing device; an inter-axis distance is calculated based on the distance between the photographed object and the photographing device; a first picture is obtained after moving the robot for half of the inter-axis distance along the movement direction; a second picture is obtained after moving the robot for entire of the inter-axes distance from a current position along an opposite direction of the movement direction; and a 3D picture of the photographed object is obtained after the first picture and the second picture are synthesized.

For the purpose of describing the technical solutions of the present disclosure, the following describes through specific embodiments.

Embodiment 1

Figure 1:
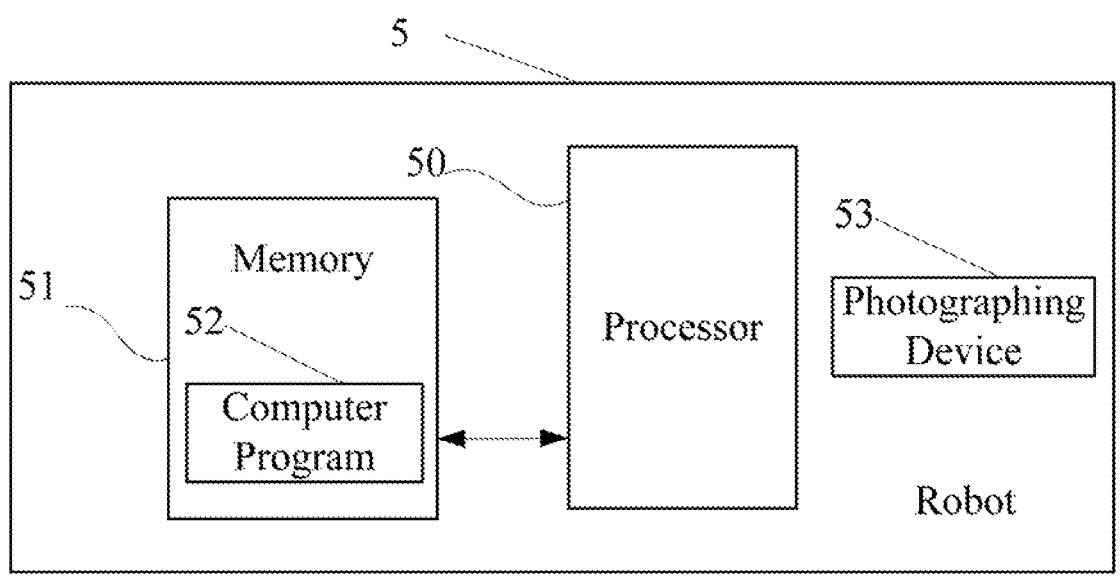
FIG. 1 is a schematic block diagram of a robot according to a first embodiment of the present disclosure.
Figure 2:
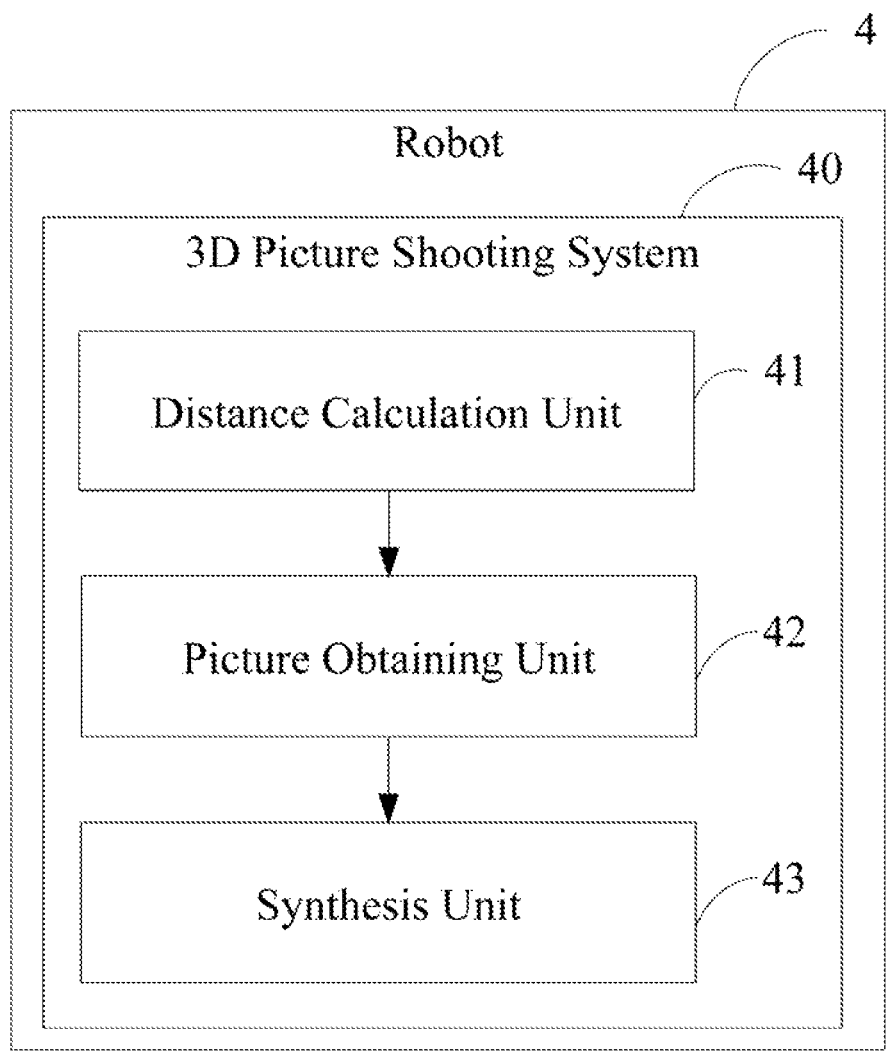
FIG. 2 is a schematic block diagram of a robot-based 3D picture shooting system according to a second embodiment of the present disclosure.

FIG. 1 is a schematic block diagram of a robot according to a first embodiment of the present disclosure. As shown in FIG. 1, the robot 5 of this embodiment includes a processor 50, a memory 51, a computer program 52 stored in the memory 51 and executable on the processor 50, and a photographing device 53, When executing (instructions in) the computer program 52, the processor 50 implements the steps in the above-mentioned embodiments of the robot-based 3D picture shooting method, for example, steps S11-S15 shown in FIG. 3. Alternatively, when the processor 50 executing the (instructions in) computer program 52, the functions of each module unit in the above-mentioned device embodiments, for example, the functions of the units 41-44 shown in FIG. 2 are implemented.

Exemplarily, the computer program 52 may be divided into one or more modules/units, and the one or more modules/units are stored in the storage 61 and executed, by the processor 50 to realize the present disclosure. The one or more modules units may be a series of computer program instruction sections capable of performing a specific function, and the instruction sections are for describing the execution process of the computer program 52 in the robot 5. For example, computer program 52 can be divided into a distance calculation unit, a picture obtaining unit, and a synthesis unit, in which:

the distance calculation unit is configured to obtain a distance between a photographed object and the photographing device of the robot based on a received shooting instruction, in response to a movement direction of the robot is perpendicular to a shooting direction of the photographing device, and configured to calculate an inter-axis distance based on the distance between the photographed object and the photographing device, wherein the inter-axis distance includes a distance between a position at which the photographing device obtaining a first picture of the photographed object and another position at which the photographing device obtaining a second picture of the photographed object;

the picture obtaining unit is configured to obtain the first picture after moving the robot for half of the inter-axis distance along the movement direction, and configured to obtain the second picture after moving the robot for entire of the inter-axis distance from a current position along an opposite direction of the movement direction; and the synthesis unit is configured to synthesize the first picture and the second picture to obtain a 3D picture of the photographed object.

Furthermore, the picture obtaining unit includes:

a determination module configured to determine whether the inter-axis distance is valid; and a first picture obtaining module is configured to move the robot for half of the inter-axis distance alone the movement direction to obtain the first picture, if the inter-axis distance is valid.

In one embodiment, the robot 5 further includes:

a preset speed obtaining unit configured to obtain a preset speed and move the robot at the preset speed.

Furthermore, the distance calculation unit includes:

an equivalent focal length obtaining module configured to obtain an equivalent focal length of the photographing device; and an inter-axis distance calculating module configured to calculate a quotient between the distance between the photographed object and the photographing device and the equivalent distance to obtain the inter-axis distance.

Furthermore, the robot 5 further includes:

an adjustment unit configured to obtain the shooting direction of the photographing device and adjust the movement direction of the robot to be perpendicular to the shooting direction.

Each of the above-mentioned units and modules may be implemented in the form of hardware (e.g., a circuit), software (e.g., a program), or a combination thereof (e.g., a circuit with a single chip microcomputer). It can be understood b those skilled in the art that FIG. 1 is merely an example of the robot 5 and does not constitute a limitation, on the robot 5, and may include more or fewer components than those shown in the figure, or a combination of some components or different components. For example, the robot 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program and other programs and data required by the robot 5. The storage 51 may also be used to temporarily store data that has been or will be output.

Embodiment 2

FIG. 2 is a schematic block diagram of a robot-based 3D picture shooting system according to, a second embodiment of the present disclosure, which corresponds to the robot-based 3D picture shooting method described in the above-mentioned embodiments. For convenience of description, only the parts related to this embodiment are shown.

As shown in FIG. 2, a robot-based 3D picture shooting system 40 includes; a distance calculation unit 41, a picture obtaining unit 42, and a synthesis unit 43. The robot-based 3D picture shooting system is utilized in a robot 4 with a photographing device.

The distance calculation unit 41 is configured to obtain a distance between a photographed object and the photographing device of the robot based on a received shooting instruction, in response to a movement direction of the robot is perpendicular to a shooting direction of the photographing device, and configured to calculate an inter-axis distance based on the distance between the photographed object and the photographing device, where the inter-axis distance includes a distance between a position at which the photographing device obtaining a first picture of the photographed object and another position at which the photographing device obtaining a second picture of the photographed object.

The picture obtaining unit 42 is configured to obtain the first picture after moving the robot for half of the inter-axis distance along the movement direction, and configured to obtain the second picture after moving the robot for entire of the inter-axis distance from a current position along an opposite direction of the movement direction.

The synthesis unit 43 is configured to synthesize the first picture and the second picture to obtain a 3D picture of the photographed object.

Furthermore, the picture obtaining unit 42 includes:

a determination module configured to determine whether the inter-axis distance is valid; and a first picture obtaining module is configured to move the robot for half of the inter-axis distance along the movement direction to obtain the first picture if the inter axis distance is valid.

In one embodiment, the robot-based 3D picture shooting system further includes:

a preset speed obtaining unit configured to obtain a preset speed and move the robot at the preset speed.

Furthermore, the distance calculation unit 41 includes:

an equivalent focal length obtaining module configured to obtain an equivalent focal length of the photographing device; and an inter-axis distance calculating module configured to calculate a quotient between the distance between the photographed object and the photographing device and the equivalent distance to obtain the inter-axis distance.

Furthermore, the robot-based 3D picture shooting system further includes:

an adjustment unit configured to obtain the shooting direction of the photographing device and adjust the movement direction of the robot to be perpendicular to the shooting direction.

Each of the above-mentioned units and modules may be implemented in the form of hardware (e.g., a circuit), software (e.g., a program), or a combination thereof (e.g., a circuit with a single chip microcomputer). In one embodiment, the robot-based 3D picture shooting system 40 may further includes a processor, a memory, and a computer program stored in the memory and executable on the processor, in which the computer program includes the distance calculation unit 41, the picture obtaining unit 42, and the synthesis unit 43. It should be understood that, the sequence of the serial number of the steps in the above-mentioned embodiments does not mean the execution order while the execution order of each process should be determined by its function and internal logic, which should not be taken as any limitation to the implementation process of the embodiments.

Embodiment 3

Figure 3:
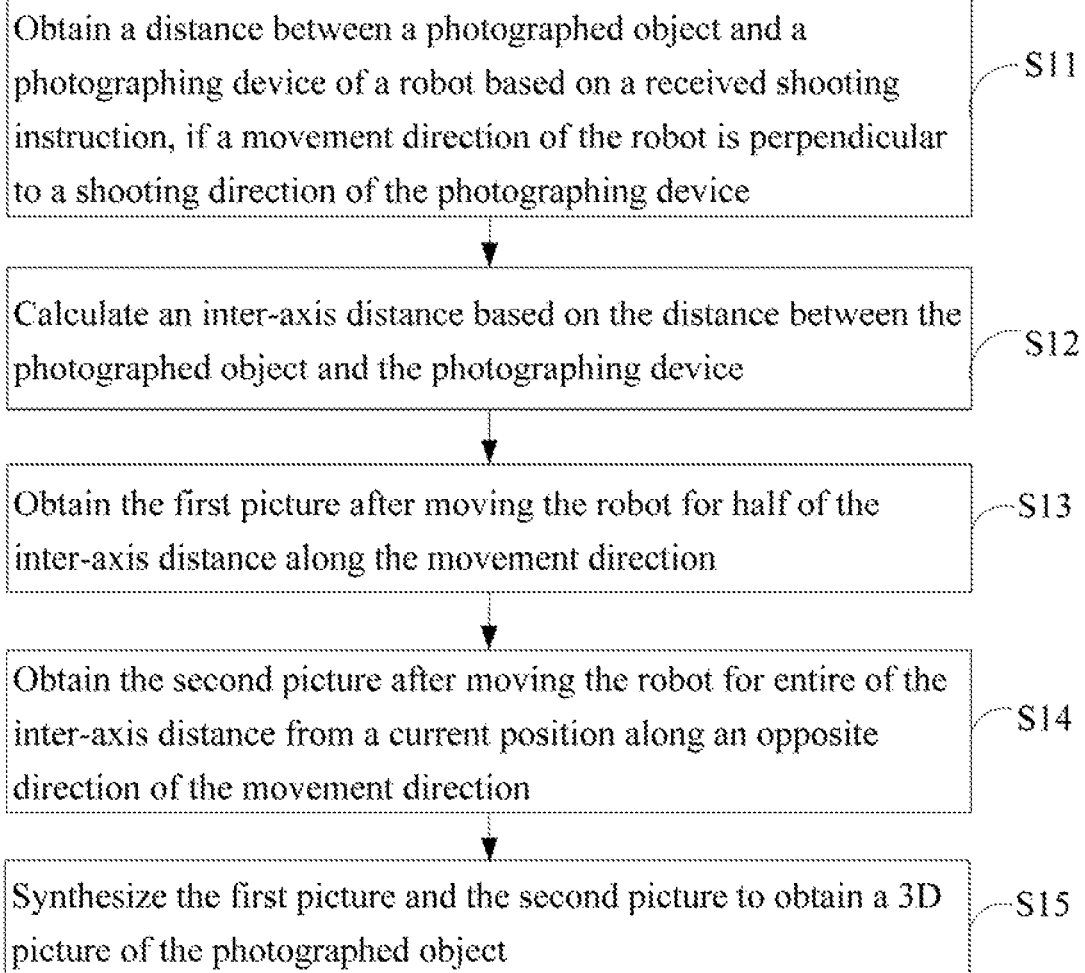
FIG. 3 is a filmy chart of a robot-based 3D picture shooting method according to a third embodiment of the present disclosure.

FIG. 3 is a flow chart of a robot-based 3D picture shooting method according to a third embodiment of the present disclosure. The robot-based 3D picture shooting method is applied to a robot with a photographing device. In this embodiment, the method is a computer-implemented method executable for a processor, which may be implemented through a robot-based 3D picture shooting system for a robot with a photographing device shown in FIG. 2. As shown in FIG. 3, the method includes the following steps.

S11: obtaining a distance between a photographed object and the photographing device of the robot based on a received shooting instruction, if a movement direction of the robot is perpendicular to a shooting direction of the photographing device.

In this embodiment, when the user wants to obtain a 3D (three-dimensional) picture of the photographed object (the object to be photographed), if the movement direction of the robot is perpendicular to the shooting direction of the photographing device, the shooting instruction is transmitted, and the robot detects the position of the photographed object based on the received shooting instruction and obtains the distance between the photographed object and the photographing device.

In this embodiment, the photographing device is a monocular camera disposed in the robot.

In one embodiment, when obtaining the distance between the photographed object and the photographing device, the distance detection may be directly performed by the photographing de ice, or performed by the laser radar technology or an infrared detecting sensor disposed in the robot. Different distance detection methods can be selected according to the feature of the photographed object, which is not limited herein.

S12: calculating an inter-axis distance based on the distance between the photographed object and the photographing device, where the inter-axis distance includes a distance between a position at which the photographing device obtaining a first picture of the photographed object and another position at which the photographing device obtaining a second picture of the photographed object.

In this step, the inter-axis distance is calculated based on the detected distance between the photographed object and the photographing device. In which, the inter-axis distance refers to the distance between the positions at which the photographing device locates in two shots of the photographing device to shoot a left picture and a tight picture (i.e., the first picture and the second picture) of the photographed object. That is to say, the photographing device shoots the first picture at a current position, and the second picture is shot after the photographing device moves a certain distance. The distance between the positions of the two shots of the photographing device is the inter-axis distance.

When shooting 3D images, the size of the inter-axis distance directly affects the quality of the shot 3D image. If the inter-axis distance is too large, the objects in the close-distance foreground or the long-distance background may be excessively separated and the photographed object will also be miniaturized due to the exaggerated stereo effect. Conversely, it the inter-axis distance is too small, a view effect that the photographed object is bigger than m reality will be produced. Therefore, in this embodiment, the inter-axis distance at this shooting is first calculated based on the distance between the photographed object and the photographing device.

S13: obtaining the first picture after moving, the robot for half of the inter-axis distance along the movement direction.

In this embodiment, the robot is moved from a current position for half of the inter-axis distance (i.e., ½ of a inter-axis distance) along the movement direction of the robot based on the calculated inter-axis distance, and then the first picture of the photographed object is shot at the position after the movement. For example, when shooting left picture and a right picture in a 3D picture, a picture of the left or right side of the photographed object is shot at the current position.

S14: obtaining the second picture after moving the robot for entire of the inter-axis distance from a current position along an opposite direction of the of the movement direction.

In this step, after the photographing device obtains the first picture of the photographed object, the robot is controlled to move for entire of the inter-axis distance (i.e., one inter-axis distance) along the opposite direction of, the movement of the robot when shooting the first picture to reach the shooting position of the second picture, and then the second picture of the photographed object is obtained at the shooting position of the second picture.

For example, in step S13, if a left side picture of the photographed object, that is, the first picture is obtained after the robot is moved along its movement direction (to the left with respect to the photographed object), and then in step 14, the robot is moved to the right for entire of the inter-axis distance to obtain a right side picture of the photographed object, that is, the second picture.

In one embodiment, the robot-based 3D picture shooting method further includes:

obtaining a preset speed; and moving the robot at the preset speed.

In order to reduce the change of the state or posture of the photographed object within the time interval of obtaining the two pictures, the robot is controlled to move to the corresponding position as soon as possible. In this case, a movement speed of the robot can be set in advance, and then the robot is controlled to quickly move to the corresponding shouting position according to the obtained preset movement speed, to as to shorten the movement time of the photographing device.

S15; synthesizing the first picture and the second picture to obtain a 3D picture of the photographed object.

In this step, the obtained first picture and second picture of the photographed object are synthesized (combined) to obtain the 3D picture of the photographed object.

In this embodiment, a distance between a photographed object and a photographing device disposed in the robot is obtained based on a received shooting instruction, if a movement direction of a robot is perpendicular to a shooting direction of the photographing device; an inter-axis distance is calculated based on the distance between the photographed object and the photographing device; a first picture is obtained after moving the robot for half of the inter-axis distance along the movement direction; second picture is obtained after moving the robot for entire of the inter-axis distance from a current position along an opposite direction of the movement direction; and a 3D picture of the photographed object is obtained after the first picture and the second picture are synthesized. In the process, the monocular camera the photographing device) disposed in the robot can calculate the inter-axis distance based on the distance with respect to the photographed object, and then the robot moves the photographing device according to the calculated inter-axis distance, and obtains two pictures of the left and right of the photographed object, which is not necessary to use a binocular camera, thereby saving the cost of the photographing device. In addition, the inter-axis distance is calculated based on the distance between the photographing device and the photographed object, and then a picture is shot based on the calculated inter-axis distance, which makes the focal length of the monocular camera flexible, so that its movement distance is flexible and can meet the higher requirements of users.

Figure 4:
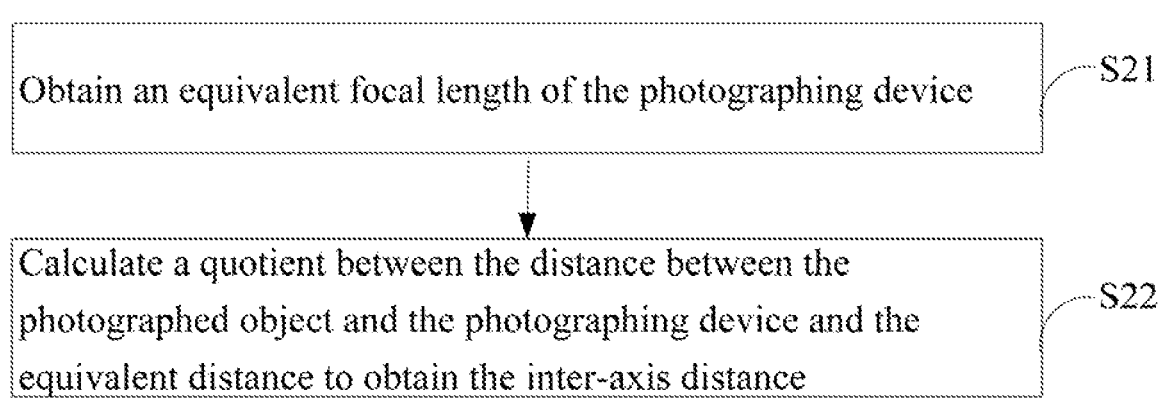
FIG. 4 is a flow chart of step S12 of the robot-based 3D picture shooting method according to the third embodiment of the present disclosure.

FIG. 4 is a flow chart of step S12 of the robot-based 3D picture shooting method according to the third embodiment of the present disclosure. As shown in FIG. 4, the method includes the following steps.

S21: obtaining an equivalent focal length of the photographing: device; and

S22: calculating a quotient between the distance between the photographed object and the photographing device and the equivalent distance to obtain the inter-axis distance.

Specifically, the inter-axis distance is calculated according to the set formula. In this case, the equivalent focal length of the photographing device is obtained. The equivalent focal length is a full frame equivalent focal length, which can be obtained according to the specifications of the photographing device. Then, the inter-axis distance is calculated according to the following formula: the inter-axis distance=the distance between the photographed object and the photographing device/the equivalent focal length.

In other embodiments, the step of obtaining the first picture after moving the robot for hall of the inter-axis distance along the movement direction includes:

determining whether the inter-axis distance is valid; and moving the robot for half of the inter-axis distance along the movement direction to obtain the first picture, if the inter-axis distance is valid.

In this step, the validity of the calculated inter-axis distance is determined, and the first picture is obtained when the inter-axis distance is valid, so as to avoid the case that the 3D picture obtained under the invalid inter-axis distance has poor effect. When determining the validity of the inter-axis distance, whether the distance between the photographed object and the photographing device is within a preset distance range (for example, 0.01 m<the distance between the photographed object and the photographing device <2 m) is determined. The inter axis distance calculated through the above-mentioned formula is used to determine whether the robot can complete the movement after calculating the hater axis distance, for example, determining whether there is no obstacle on the moving path, and if so, the inter-axis distance is determined to be valid.

In other embodiments, before the step of obtaining the distance between the photographed object and the photographing device based on the received shooting instruction further includes:

obtaining the shooting direction of the photographing device; and adjusting the movement direction of the robot to be perpendicular to the shooting direction.

Specifically, after receiving the shooting instruction, the robot obtains the shooting direction of the photographing device at the current time, and determines whether the shooting direction is, perpendicular to the movement direction u the robot. It the two are not perpendicular, the movement direction of the robot is adjusted to be perpendicular to the shooting direction first.

Embodiment 4

Figure 5:
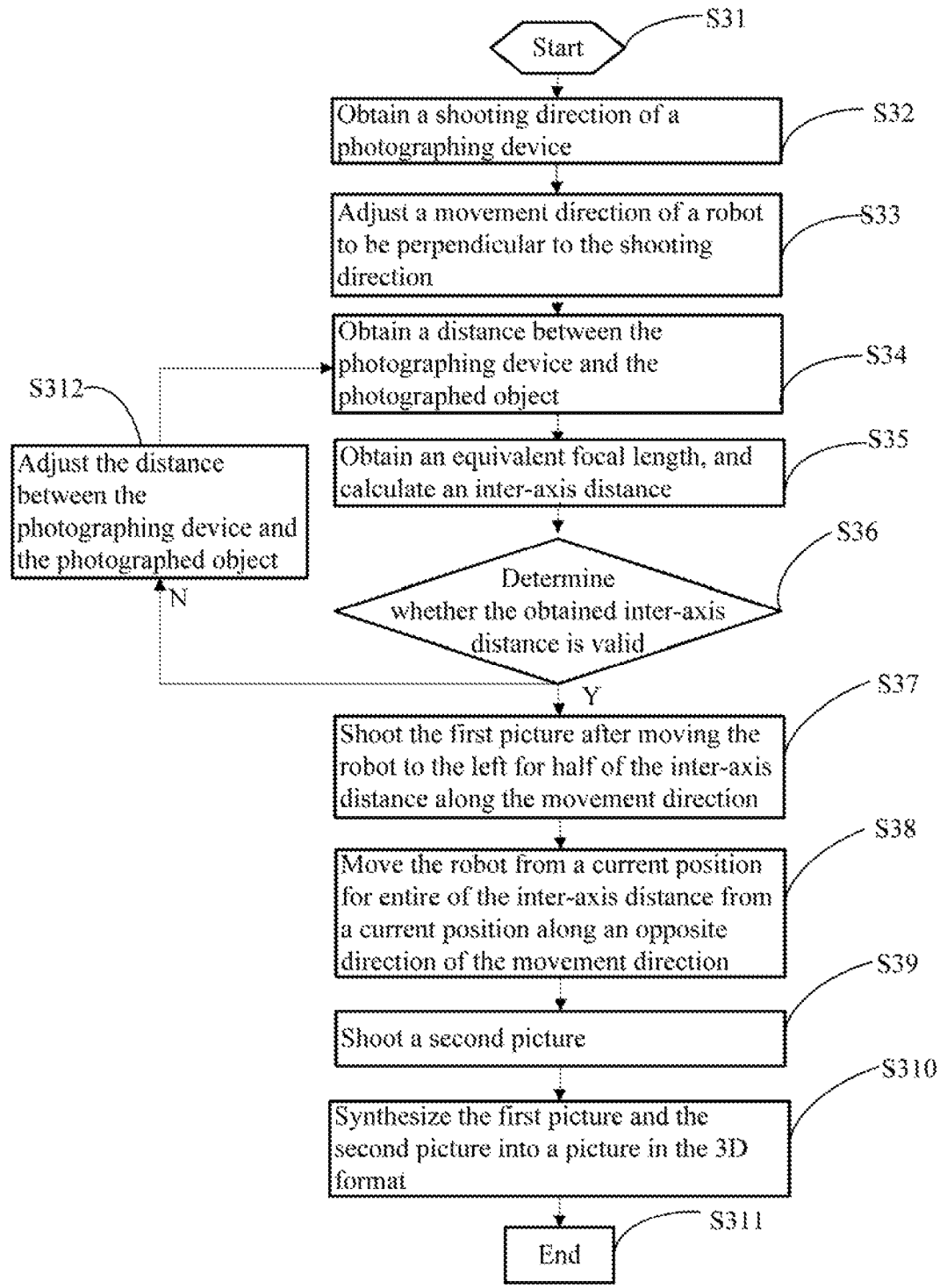
FIG. 5 is a flow chart of a robot-based 3D picture shooting method according to a fourth embodiment of the present disclosure.

FIG. 5 is a flow chart of a robot-based 3D picture shooting method according to a fourth embodiment of the present disclosure. As shown in FIG. 5, in step S31, shootings are started; in step S32, a shooting direction of a photographing device is obtained; in step S33, a movement direction of a robot is adjusted to be perpendicular to the shooting direction; in step S34, a distance between the photographing device and the photographed object is obtained; in step S35, an equivalent focal length is obtained, and an inter-axis distance is calculated based on the distance between the photographing de Lice and the photographed object and an equivalent focal length; in step S36, it is determined whether the obtained inter axis distance is valid: if not, step S312 is executed to adjust the distance between the photographing device and the photographed object, and then return to step S34 to detect the distance between the photographing device and the photographed object again, or directly execute the ending step S311 FIG. 5; and if yes, step S37 is executed to shoot the first picture after moving the robot to the left for half of the inter-axis distance along the movement direction; in step S38, the robot is moved from a current position for entire of the inter-axis distance from a current position along an opposite direction of the movement direction, and then step S39 is executed to shoot a second picture; in step S310, the first picture and the second picture are synthesized into a picture in the 3D format to obtain a 3D picture of the photographed object. In the process, the monocular camera (i.e, the photographing device) disposed in the robot can calculate the inter-axis distance based on the distance with respect to the photographed object, and then the robot moves the photographing device according to the calculated inter-axis distance, and obtains two pictures of the left and right of the photographed object, which is not necessary to use a binocular camera, thereby saving the cost of the photographing device. In addition, the inter-axis distance is calculated based on the distance between the photographing device and the photographed object, and then a picture is shot based on the calculated inter-axis distance, which makes the focal length of the monocular camera flexible, so that its movement distance is flexible and can meet the higher requirements of users.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions, the functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has, its focuses, and the parts which are not described or mentioned in one embodiment may refer to the related descriptions in other embodiments.

Those ordinary skilled in the art may clearly understand that, the implemented units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed robot, system and method may be implemented in other manners. For example, the above-mentioned robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or Communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional it in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should, be understood by those skilled in the art that, the technical schemes in each of the above-mentioned embodiments may still be modified, or some of the technical features may be equivalently replaced, while these modifications or replacements do not, make the essence of the corresponding technical schemes depart from the spirit and scope of the technical schemes of each of the embodiments of the present disclosure, and should be included within the scope of the present disclosure.

What is claimed is:

1. A computer-implemented robot-based 3D picture shooting method for a robot with a photographing device, comprising executing on a processor the steps of:
    obtaining a distance between a photographed object and the photographing device of the robot based on a received shooting, instruction, in response to a movement direction of the robot being perpendicular to a shooting direction of the photographing device;
    calculating an inter-axis distance based on the distance between the photographed object and the photographing device, wherein the inter-axis distance comprises a distance between a position the photographing device obtaining, a first picture of the photographed object and another position the photographing device obtaining a second picture of the photographed object;
    obtaining the first picture after moving the robot for half of the inter-axis distance along the movement direction;
    obtaining the second picture after moving the robot for entire of the inter-axis distance from a current position along an opposite direction of the movement direction; and
    synthesizing the first picture and the second picture to obtain a 3D picture of the photographed object.

2. The method of claim 1, wherein the step of obtaining the first picture after moving the robot for half of the inter-axis distance along the movement direction comprises;
    determining whether the inter-axis distance is valid; and
    moving the robot for half of the inter-axis distance along the movement direction to obtain the first picture, in response to the inter-axis distance being valid.

3. The method of claim 1, wherein before the step of obtaining the distance between the photographed object and the photographing device based on the received shooting instruction further comprises:
    obtaining the shooting direction of the photographing device; and
    adjusting the movement direction of the robot to be perpendicular to the shooting direction.

4. The method of claim 1, wherein the step of calculating the inter-axis distance based on a distance between the photographed object and the photographing device comprises:
    obtaining an equivalent focal length of the photographing device; and calculating a quotient between the distance between the photographed object and the photographing device and the equivalent distance to obtain the inter-axis distance.

5. The method of claim 1, further comprising:
obtaining a preset speed; and
moving the robot at the preset sped.

6. The method of claim 1, wherein the photographing device is a monocular camera.

7. A robot-based 3D picture shooting system for a robot with a photographing device, comprising:
a distance calculation unit configured to obtain a distance between a photographed object the photographing device of the robot based on a received shooting instruction, in response to a movement direction of the robot being perpendicular to a shooting direction of the photographing device, and configured to calculate an inter-axis distance based on the distance between the photographed object and the photographing device, wherein the inter-axis distance comprises a distance between a position the photographing device obtaining a first picture of the photographed object and another position the photographing device obtaining a second picture of the photographed objects;
a picture obtaining unit configured to obtain the first picture after moving the robot for half of the inter-axis distance along the movement direction, and configured to obtain the second picture after moving the robot for entire of the inter axis distance from a current position along an opposite direction of the movement direction; and
a synthesis unit configured to synthesize the first picture and the second picture to obtain a 3D picture of the photographed object.

8. The system of claim 7, wherein the step of obtaining the first picture after moving the robot for half of the inter-axis distance along the movement direction comprises:
a determination module configured to determine whether the inter-axis distance is valid; and
a first picture obtaining module is configured to move the robot for half of the inter-axis distance along the movement direction to obtain the first picture, in response to the inter-axis distance being valid.

9. The system of claim 7, further comprising an adjustment unit configured to:
obtain the shooting direction of the photographing device; and
adjust the movement direction of the robot to be perpendicular to the shooting direction.

10. The system of claim 7, wherein the distance calculation unit comprises:
an equivalent focal length obtaining module configured to obtain an equivalent focal length of the photographing device; and
an inter-axis distance calculating module configured to calculate a quotient between the distance between the photographed object and t e photographing device and the equivalent distance to obtain the inter-axis distance.

11. The system of claim 7, further comprising a preset speed obtaining unit configured to:
obtain a preset speed; and
move the robot at the preset speed.

12. The system of chum 7, wherein the photographing device is a monocular camera.

13. A robot, comprising:
a photographing device;
a memory;
one or more processors; and
one or more computer programs stored in the memory and executable on the one or more processors, wherein the one or more computer programs comprise:
instructions for obtaining a distance between a photographed object and the photographing device of the robot based on a received shooting instruction, in response to a movement direction of the robot being perpendicular to a shooting, direction of the photographing device;
instructions for calculating an inter-axis distance based on the distance between the photographed object and the photographing device, wherein the inter-axis distance comprises a distance between a position the photographing device obtaining a first picture of the photographed object and another position the photographing device obtaining a second picture of the photographed object;
instructions for obtaining the first picture, after moving the robot for half of the inter-axis distance along the movement direction;
instructions for obtaining the second picture after moving the robot for entire of the inter-axis face horn a current position along m opposite direction of the movement direction; and
instructions for synthesizing the first picture and the second picture to obtain a 3D picture of the photographed object.

14. The robot of claim 13, wherein instructions for obtaining the first picture after moving the robot for half of the inter-axis distance along the movement direction comprises:
instructions for determining whether the inter-axis distance is valid; and
instructions for moving the robot for half of the inter-axis distance along the movement direction to obtain the first picture, in response to the inter-axis distance being valid.

15. The robot of claim 13, wherein the one or more computer programs further comprise:
instructions for obtaining the shooting direction of the photographing device; and
instructions for adjusting the movement direction of the robot to be perpendicular to the shooting direction.

16. The robot of claim 13, wherein the instructions for calculating the inter-axis distance based on a distance between the photographed object and the photographing device comprises:
instructions for obtaining an equivalent focal length of the photographing device; and
instructions for calculating a quotient between the distance between the photographed object and the photographing, device and the equivalent distance to obtain the inter-axis distance.

17. The robot of claim 13, wherein the one, or more computer programs further comprise:
instructions for obtaining a preset speed; and
instructions for moving the robot at the preset speed.

18. The robot of claim 13, wherein the photographing device is a monocular camera.

* * * * *